US012406662B2

(12) United States Patent
Perkins et al.

(10) Patent No.: US 12,406,662 B2
(45) Date of Patent: Sep. 2, 2025

(54) PROMPTING LANGUAGE MODELS TO SELECT API CALLS

(71) Applicant: ASAPP, INC., New York, NY (US)

(72) Inventors: Hugh Nicholas Perkins, Queens, NY (US); Michael Griffiths, Brooklyn, NY (US); Tao Ma, Mountain View, CA (US); Connor Daniel McNabb, Denver, CO (US); Theodore David Burke, Brooklyn, NY (US); Yi Yang, Long Island City, NY (US)

(73) Assignee: ASAPP, INC., New York, NY (US)

( * ) Notice: Subject to any disclaimer, the term of this patent is extended or adjusted under 35 U.S.C. 154(b) by 238 days.

(21) Appl. No.: 18/456,672

(22) Filed: Aug. 28, 2023

(65) Prior Publication Data

US 2025/0078822 A1 Mar. 6, 2025

(51) Int. Cl.
| | |
|---|---|
| *G10L 15/183* | (2013.01) |
| *G06F 9/54* | (2006.01) |
| *G10L 15/16* | (2006.01) |
| *G10L 15/22* | (2006.01) |
| *G10L 15/30* | (2013.01) |
| *H04M 3/51* | (2006.01) |

(52) U.S. Cl.
CPC ............ *G10L 15/183* (2013.01); *G06F 9/547* (2013.01); *G10L 15/16* (2013.01); *G10L 15/22* (2013.01); *G10L 15/30* (2013.01); *H04M 3/5166* (2013.01); *H04M 3/5191* (2013.01); *H04M 2201/40* (2013.01)

(58) Field of Classification Search
None
See application file for complete search history.

(56) References Cited

U.S. PATENT DOCUMENTS

| 11,875,123 B1 * | 1/2024 | Ben David ............ G06N 3/092 |
| 2024/0394285 A1 * | 11/2024 | Cunningham .......... H04L 51/02 |
| 2025/0006196 A1 * | 1/2025 | Wang ..................... G06F 40/44 |

(Continued)

OTHER PUBLICATIONS

"Significant-Gravitas/AutoGPT", https://github.com/Significant-Gravitas/AutoGPT (accessed on Sep. 25, 2024), 7 pages.

(Continued)

*Primary Examiner* — Nafiz E Hoque
(74) *Attorney, Agent, or Firm* — GTC Law Group PC & Affiliates (57) ABSTRACT

A communications session with a user may be automated using a language model. The language model may be instructed to select a next action to be performed where the next action may include transmitting a responsive communication to the user or performing an API call. The prompt used to query the language model may include one or more of the following: a representation of text of the communications session, a list of available API calls, instructions to select a next action, a representation of API calls performed, or a representation of API call responses received. The language model may be sequentially queried to continue the communications session by transmitting responsive communications or performing API calls. In some implementations, a prompt template may be used to generate the prompt and a prompt template may be selected using text of the communications session.

20 Claims, 6 Drawing Sheets

(56) References Cited

U.S. PATENT DOCUMENTS

2025/0028743 A1* 1/2025 Massoudian ........... G16H 10/60
2025/0068398 A1* 2/2025 Zeng ........................ G06F 9/54

OTHER PUBLICATIONS

Gray, Shiloh, "ASAPP Launches GenerativeAgent to Automate the Majority of Contact Center Interactions", ASAPP Press Release, https://www.globenewswire.com/news-release/2023/07/26/2711342/0/en/ASAPP-Launches-GenerativeAgent-to-Automate-the-Majority-of-Contact-Center-Interactions.html (accessed on Sep. 25, 2024), Jul. 26, 2023, 4 pages.

Schick, Timo, et al., "Toolformer: Language Models Can Teach Themselves to Use Tools", arXiv:2302.04761v1 [cs.CL], https://arxiv.org/pdf/2302.04761 (accessed on Sep. 4, 2024), Feb. 9, 2023, 17 pages.

Yao, Shunyu, et al., "ReAct: Synergizing Reasoning and Acting in Language Models", Published as a conference paper at ICLR 2023, arXiv:2210.03629v3 [cs.CL], https://arxiv.org/pdf/2210.03629 (accessed on Sep. 4, 2024), Mar. 10, 2023, 33 pages.

* cited by examiner

You are an experienced human customer service agent working for {company_name}. Please refer to yourself as 'Virtual Agent'.

The following API calls are available to you:
{api_calls}

Here are instructions to solve the customer's issues:
{instructions}

For each turn, first output THOUGHTS then thoughts describing what you will do, all on one line. Note that the customer won't see your thoughts. On the next line, always write one of:
SPEAK utterance
APICALL apicall All apicalls are instantaneous. If you have all the information needed to make a required apicall, do that first, before speaking to the customer. If you are missing the value of an apicall parameter, please ask the customer for that information.

When you make an apicall, first write THOUGHTS, and then write out the parameters you need, and their values on the same line. Then, on a new line, write APICALL, followed by the apicall.

During the THOUGHTS line, if you discover you are missing parameters, then start a new line with SPEAK, and ask the customer for the information. Only use parameter values that were provided by the customer, these instructions, or from other API responses. Parameters in apicalls should always be given in keyword format, i.e., parameterName=parameterValue Make sure your output ends with an APICALL line or a SPEAK line.

Fig. 4 authentication_check()

get_upcoming_flights(customer_number: str =)

get_flight_status(flight_id: str =)

get_connection_alternatives(flight_id: str =)

rebook_missed_flight(
  customer_number: str =,
  old_flight_id: str =,
  new_flight_id: str =)

search_kb(question: str =)

escalate_live_agent(question: str =)

change_flow(flow_name: str =)

exit_flow()

Fig. 5

Ask the customer what kind of help they need.
Provide the smallest quantity of information to the customer to answer their question.
Provide the highest level of service. If you have information to solve the problem, use it. Only ask customer for information you do not already have.

At the start of the call, before doing anything else, make sure the customer is authenticated, by calling authentication_check.
Always greet the customer and welcome them back by their preferred status level.

You can look at a customers' upcoming flights based on their customer number:
- get_upcoming_flights(customer_number: str =)
Notify the customer if they are likely to miss their connecting flight. Ask the customer what they want to do:
(a) they can keep their current booking, and AA will do everything it can to return the flight to on time, or
(b) they can find a different connecting flight.

You can check an individual flight status with:
- get_flight_status(flight_id: str =)

You can get available connection alternatives for a given flight with:
- get_connection_alternatives(flight_id: str =)

You can rebook a flight with:
- rebook_missed_flight(customer_number: str =)

Always confirm with a customer if they are OK with any additional charges, if they exist.

PROMPTING LANGUAGE MODELS TO SELECT API CALLS

BACKGROUND

Communications sessions may be automated using various techniques, such as interactive voice response techniques. Automating communications sessions may reduce costs, such as by reducing the burden on people who would otherwise respond to incoming communications, such as customer support requests.

Some techniques for automating communications sessions may be difficult to maintain or update or may be tedious for end users. For example, an interactive voice response system may use a graph to obtain information from an end user and provide responses to the user. The graph may need to be updated where the subject of the communications sessions changes (e.g., a company has a new product) and it may be difficult to update or maintain the graph. An interactive voice response system may also be tedious for end users because they are required to go through each step of a long process, which may be slower than obtaining assistance from a human.

More efficient automated communications techniques may be easier to maintain and update and also provide a better experience for end users.

SUMMARY

In some aspects, the techniques described herein relate to a computer-implemented method, including: starting a communications session with a user; obtaining session text of the communications session; creating a first language model prompt, wherein the first language model prompt includes: (a) a representation of the session text, (b) a list of available API calls, and (c) instructions to select a next action from a plurality of available next actions, wherein the plurality of available next actions includes (i) transmitting a responsive communication and (ii) performing an API call; submitting the first language model prompt to a language model to obtain a first language model response including a first next action; determining that the first next action corresponds to performing a first API call; performing the first API call to obtain a first API call response; creating a second language model prompt, wherein the second language model prompt includes: (a) the representation of the session text, (b) the list of available API calls, (c) the instructions to select a next action from the plurality of available next actions, and (d) a text representation of the first API call response; submitting the second language model prompt to the language model to obtain a second language model response including a second next action; determining that the second next action corresponds to transmitting a first responsive communication; and transmitting the first responsive communication to the user.

In some aspects, the techniques described herein relate to a computer-implemented method, wherein obtaining session text includes performing automatic speech recognition of an audio communication.

In some aspects, the techniques described herein relate to a computer-implemented method, wherein the second language model prompt includes a text representation of the first API call.

In some aspects, the techniques described herein relate to a computer-implemented method, including: selecting the list of available API calls using the session text.

In some aspects, the techniques described herein relate to a computer-implemented method, wherein selecting the list of available API calls includes processing at least a portion of the session text with a classifier neural network.

In some aspects, the techniques described herein relate to a computer-implemented method, wherein selecting the list of available API calls includes submitting a third language model prompt to the language model or a second language model.

In some aspects, the techniques described herein relate to a computer-implemented method, wherein: the plurality of available next actions includes selecting a language model prompt template; selecting the language model prompt template; and creating a third language model prompt using the language model prompt template.

In some aspects, the techniques described herein relate to a computer-implemented method, wherein the second language model prompt includes an expected format of an API call response.

In some aspects, the techniques described herein relate to a system, including at least one server computer including at least one processor and at least one memory, the at least one server computer configured to: start a communications session with a user; obtain session text of the communications session; create a first language model prompt, wherein the first language model prompt includes: (a) a representation of the session text, (b) a list of available API calls, and (c) instructions to select a next action from a plurality of available next actions, wherein the plurality of available next actions includes (i) transmitting a responsive communication and (ii) performing an API call; submit the first language model prompt to a language model to obtain a first language model response including a first next action; determine that the first next action corresponds to performing a first API call; perform the first API call to obtain a first API call response; create a second language model prompt, wherein the second language model prompt includes: (a) the representation of the session text, (b) the list of available API calls, (c) the instructions to select a next action from the plurality of available next actions, and (d) a text representation of the first API call response; submit the second language model prompt to the language model to obtain a second language model response including a second next action; determine that the second next action corresponds to transmitting a first responsive communication; and transmit the first responsive communication to the user.

In some aspects, the techniques described herein relate to a system, wherein the language model is provided by a third party and submitting the first language model prompt to the language model includes transmitting the first language model prompt to the third party.

In some aspects, the techniques described herein relate to a system, the at least one server computer is configured to: select a language model prompt template using the session text; and create the first language model prompt using the language model prompt template.

In some aspects, the techniques described herein relate to a system, wherein selecting the language model prompt template includes processing at least a portion of the session text with a classifier neural network.

In some aspects, the techniques described herein relate to a system, wherein the at least one server computer is configured to select the language model prompt template by submitting a third language model prompt to the language model or a second language model.

In some aspects, the techniques described herein relate to a system, wherein: the plurality of available next actions includes selecting a second list of available API calls; and the at least one server computer is configured to: select the second list of available API calls, and create a third language model prompt using the second list of available API calls.

In some aspects, the techniques described herein relate to a system, wherein the list of available API calls includes function names and corresponding function arguments.

In some aspects, the techniques described herein relate to a system, wherein the list of available API calls includes function argument types.

In some aspects, the techniques described herein relate to one or more non-transitory, computer-readable media including computer-executable instructions that, when executed, cause at least one processor to perform actions including: starting a communications session with a user; obtaining session text of the communications session; creating a first language model prompt, wherein the first language model prompt includes: (a) a representation of the session text, (b) a list of available API calls, and (c) instructions to select a next action from a plurality of available next actions, wherein the plurality of available next actions includes (i) transmitting a responsive communication and (ii) performing an API call; submitting the first language model prompt to a language model to obtain a first language model response including a first next action; determining that the first next action corresponds to performing a first API call; performing the first API call to obtain a first API call response; creating a second language model prompt, wherein the second language model prompt includes: (a) the representation of the session text, (b) the list of available API calls, (c) the instructions to select a next action from the plurality of available next actions, and (d) a text representation of the first API call response; submitting the second language model prompt to the language model to obtain a second language model response including a second next action; determining that the second next action corresponds to transmitting a first responsive communication; and transmitting the first responsive communication to the user.

In some aspects, the techniques described herein relate to one or more non-transitory, computer-readable media, wherein the user is obtaining customer support from a company.

In some aspects, the techniques described herein relate to one or more non-transitory, computer-readable media, wherein the first language model prompt does not include a graph corresponding to an interactive voice response system.

In some aspects, the techniques described herein relate to one or more non-transitory, computer-readable media, wherein the representation of the session text includes an automatically-generated summary of at least a portion of the session text.

BRIEF DESCRIPTION OF THE FIGURES

The invention and the following detailed description of certain embodiments thereof may be understood by reference to the following figures:

FIG. 4 is an example language model prompt template.

FIG. 5 is an example list of API calls that may be used with a prompt template.

DETAILED DESCRIPTION

Providing support to customers may be a significant expense for a company. A company may reduce expenses by automating at least some of the customer support process in place of human customer support agents. Automated support tools may interact with users using any appropriate techniques, such as via text, voice, video, or any combination thereof. In some implementations, automated support tools may be implemented using an interactive voice response system.

In some implementations, automated support tools may be implemented using a graph. At nodes of the graph, a user may be asked to provide information, and depending on the response provided by the user, the support process may transition to another node of the graph. For example, at the beginning of the support process, the user may be asked if the support request relates to making a new purchase to a previous purchase. Where the customer indicates a previous purchase, the support process may transition to another node where the customer is asked to provide an order number. This process may continue until the support request has been completed.

An API (application programming interface) may be used at different nodes of the graph to obtain information or perform actions. For example, after the user provides an order number, an API may be used to retrieve details of the order. For another example, where the customer requests a refund, an API may be used to cause a credit to be issued to the user's credit card.

Implementing automated support using a graph may have disadvantages. A disadvantage may be that it is tedious for the end user to navigate through many nodes of a graph to complete a support request. Further, where a user makes a mistake the user may need to start over again at the beginning. Another disadvantage may be complexity for the company to maintain the graph and/or make changes to the graph to support changes to the support process or new products and services. An automated support process that emulates the capabilities of a human support agent may provide better support to users at lower cost and complexity.

Large language models (LLMs), such as the GPT models created by OpenAI™, have recently provided impressive results for a variety of tasks. A user may submit a text question to an LLM to receive a response or may provide text instructions to an LLM to perform a task. The response of the LLM may appear similar to a response generated by a person or may even perform better than many people on certain tasks. An LLM may be any language model that has a larger number of parameters. The techniques described herein may be performed with any appropriate language model, and a large language model is not required.

A language model is a mathematical model that stores information about natural language, such as patterns, structures, and relationships of natural language. A language model may, for example, be able to determine probabilities, likelihoods, or scores corresponding to sequences of words or sentences or may be able to generate text. For example, a language model may be used for one or more of the following applications: text completion, text generation, language translation, sentiment analysis, or text summarization. A language model may use any appropriate mathematical model, such as a neural network. In some implementations, a language model may use a transformer model architecture, such as one or more transformer blocks. In some implementations, a language model may include sequences of layers, such as one or more of the following layers: an embedding layer, an attention layer, a multi-head attention layer, a feed-forward layer, a normalization layer, a linear layer, or a softmax layer.

Language models may automate many text-processing tasks that are tedious or difficult for a person. Language models may also perform tasks relating to processing text that is different from everyday language, such as computer software, the text of web pages (e.g., web pages written using HTML or hypertext markup language), or descriptions of API calls.

A language model may be used to automate customer support. A language model may be provided with information relating to a customer support request, such as any combination of the following information: text of communications of a customer support session; a list of API calls that are available to be performed to assist with the support request; text corresponding to API calls previously performed during the support session; text corresponding to API call responses previously received during the support session; and instructions for how to process the foregoing information to indicate a next action to be performed in the support session (e.g., an API call to be performed or a communication to transmit to the user). The text that is submitted to a language model may be referred to as a prompt. The language model may return text that is responsive to the prompt, and this text may be processed to facilitate the customer support request.

Figure 1:
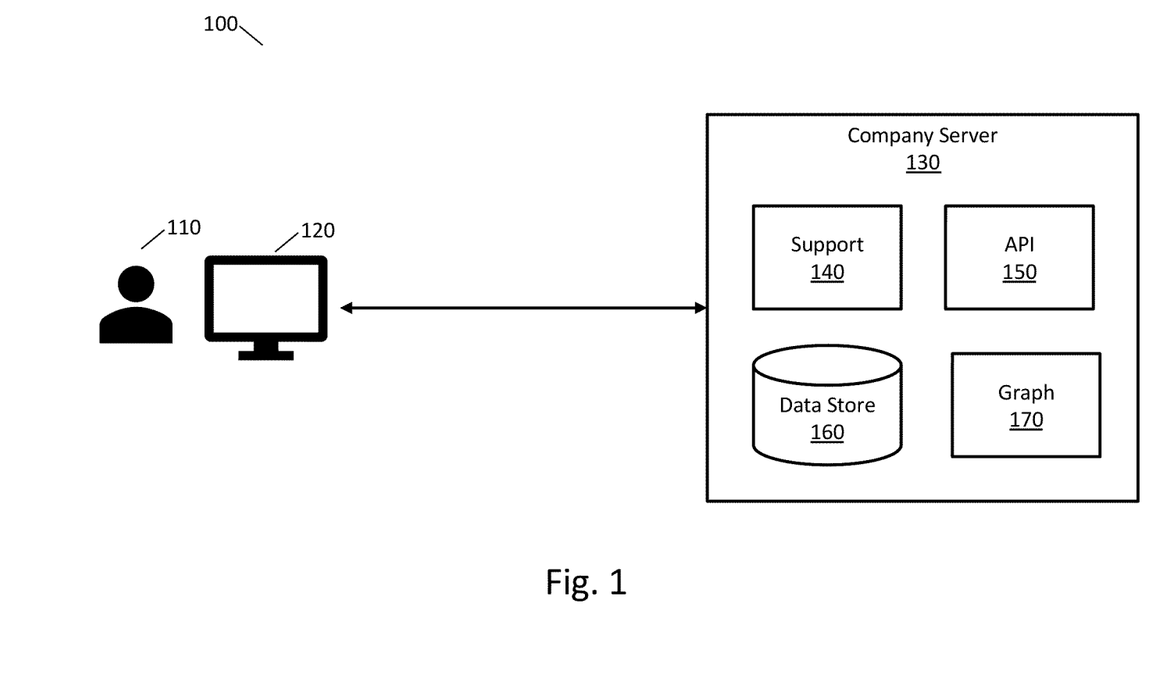
FIG. 1 is an example system that may be used to provide automated customer support using a graph.

FIG. 1 is an example system 100 that may be used to provide automated customer support using a graph. In FIG. 1, user 110 may use device 120 to obtain support from a company. Device 120 may be any appropriate device, such as a computer, tablet, conventional phone or a smart phone. User 110 may communicate the support request using any appropriate techniques, such as any combination of text, speech, or video. The support request may be transmitted over any appropriate network, such as a cellular network or the Internet.

The support request may be received at company server 130. Company server 130 may be implemented by company or a third party and may be implemented using any appropriate techniques, such as cloud computing, and may include multiple server computers.

Company server 130 may include various components, such as the components illustrated in FIG. 1. Support component 140 may perform any appropriate operations, such as receiving communications from a user, creating a support session, interacting with other components of company server 130, and providing a responsive communication to the user. API component 150 may perform any appropriate API calls to assist with a customer support request, such as to retrieve information relating to the request or to perform actions relating to the request. Graph component 170 may perform any appropriate operations relating to the use of a graph to provide customers, such as indicating a current node of the graph, returning a request for further information to be provided to the user (e.g., a free form question or a list of options) corresponding to a node of the graph, or indicating a next node of the graph based on a communication received from the user. Data store 160 may store any appropriate information to be used during the support request, such as information about the user or information about products and services of the company.

Figure 2:
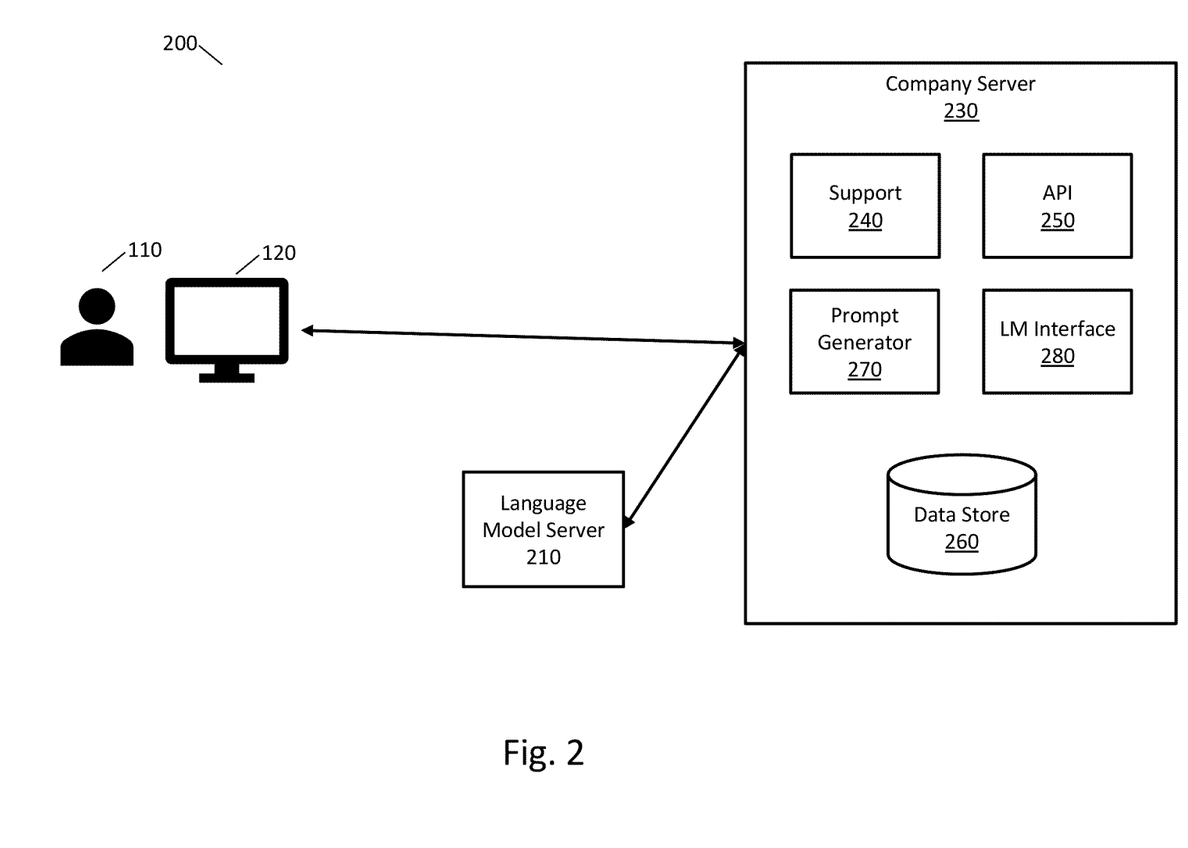
FIG. 2 is an example system that may be used to provide automated customer support using a language model.

FIG. 2 is an example system 200 that may be used to provide automated customer support using a language model. In FIG. 2, user 110 and device 120 may be similar to FIG. 1.

Company server 230 may be similar to company server 130 but may provide customer support using a language model. In some implementations, company server 230 may also use a graph, but in some implementations, company server 230 may not use a graph.

Support component 240 may be similar to support component 140 but may interact with other components of company server 230 to provide support to a user, such as generating a language model prompt, submitting the language model prompt to a language model, and using the response of the language model to facilitate resolving the customer support request.

API component 250 may be implemented in a similar manner as API component 150, but may have access to the same or different set of APIs.

Prompt generator component 270 may generate a prompt using any appropriate techniques, such as any of the techniques described herein. In some implementations, prompt generator component 270 may obtain a prompt template and use the prompt template to generate a prompt using other text (e.g., text of communications, API calls, or API call responses).

Language model interface 280 may facilitate sending prompts to a language model and receiving responses from the language model. Language model interface 280 may use any appropriate language model, such as a language model component on company server 230 (not shown) or a language model available in another location, such as language model server 210.

Data store 260 may store any appropriate information to be used during the support request, such as language model prompts, language model prompt templates, or any of the information stored by data store 160.

Language model server 210 may be a server that receives a language model prompt, processes the prompt with a language model to generate a response, and returns the language model response to the requestor. Language model server 210 may be implemented using any appropriate techniques. For example, language model server 210 may receive language model API calls and return language model API call responses. In some implementations, language model server 210 may be operated by a third party that is different from the company that operates company server 230. In some implementations, language model server 210 may be operated by the company that operates company server 230.

Figure 3:
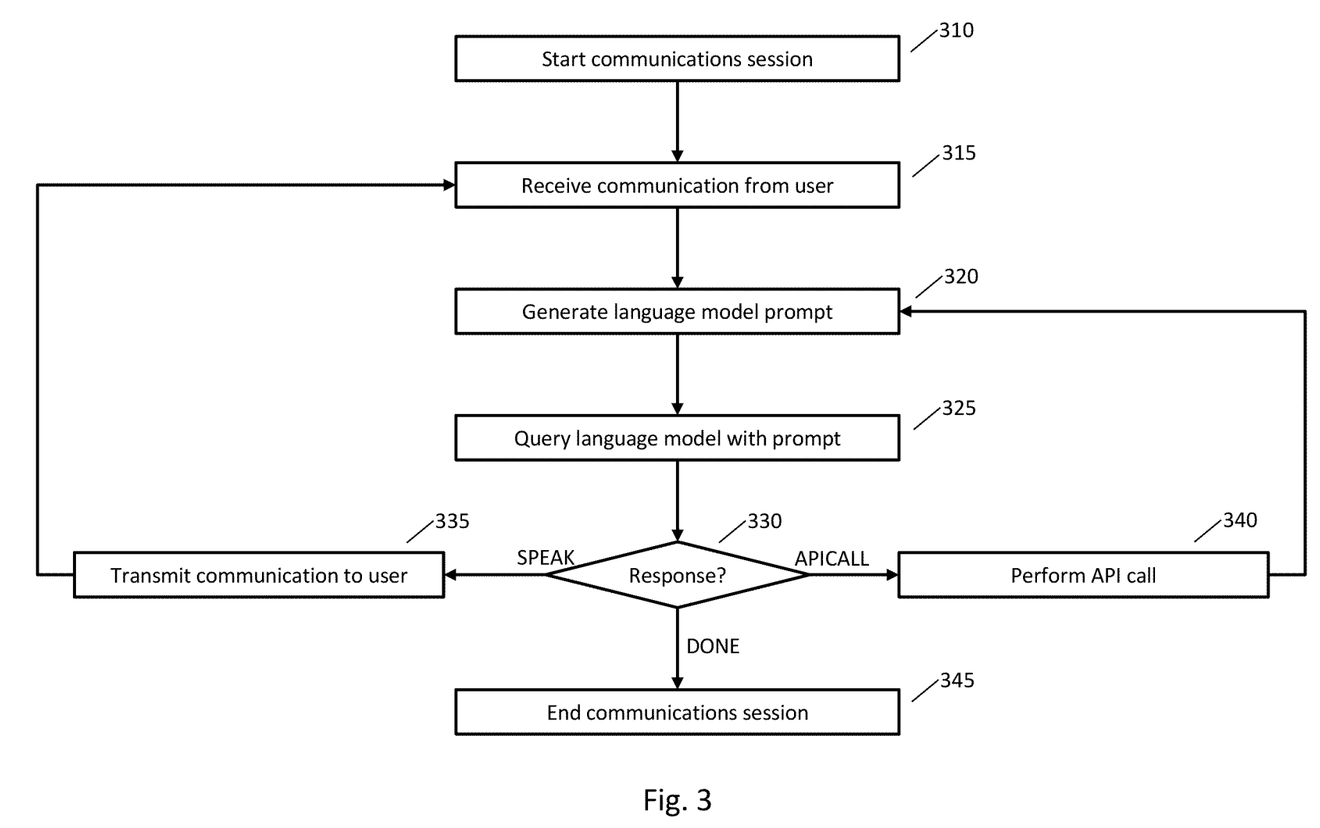
FIG. 3 is a flowchart of an example method for automating customer support by submitting prompts to a language model.

FIG. 3 is a flowchart of an example method for automating customer support by submitting prompts to a language model.

At step 310, a communications session is started. The communications session may be started using any appropriate techniques. For example, the communications session may be started upon receiving a phone call from a user, receiving an email or text message from a user, or upon receiving a notification that a user has started a support request on a website or application (e.g., a mobile device app). In some implementations, a database entry may be created corresponding to the communications session and/or support request.

At step 315, a communication is received from the user. The communication may be received using any appropriate techniques (e.g., phone, email, text message, web app, or mobile device app) in any appropriate format (e.g., any combination of text, voice, or video). Where an audio communication is received the audio communication may be converted to text using automatic speech recognition.

At step 320, a language model prompt is created. The language model prompt may be created using any appropriate techniques. In some implementations, the language model prompt may be created using a language model prompt template, such as the template of FIG. 4.

A language model prompt template may be implemented using any appropriate techniques. In some implementations, a template may have placeholders or variables to indicate that other information should be inserted in that location. For example, a placeholder or variable may be a text string that is enclosed in curly brackets, such as {company_name}. Any number of placeholders or variables may be used and may be used for any appropriate information. In the example of FIG. 4, placeholders include {company_name}, {api_calls}, and {instructions}.

The values for the placeholders or variables may be supplied using any appropriate techniques. In some implementations, software may compute or obtain values (e.g., from a database) and insert them into the template during a process of rendering the template. In some implementations, values may be obtained from the contents of another file.

The language model prompt may instruct the language model to provide a response to the prompt. In some implementations, the language model prompt may instruct the language model to perform specific actions. For example, the prompt may instruct the language model to select a next action from a specified list of available next actions. In the example of FIG. 4, the prompt instructs the language model to select either an APICALL action or a SPEAK action. In other implementations, the language model may be instructed to select from different actions and/or a different number of actions. For example, the language model may be able to select a DONE action to indicate that the session has completed (e.g., by successfully resolving a support issue). In some implementations, the language model prompt may allow the language model to select more than one next action, such as more than one APICALL action or both an APICALL action and a SPEAK action.

The language model prompt may also instruct the language model prompt to provide additional information regarding a selected action. For example, where the language model selects a SPEAK action, the language model may also be instructed to provide text that should be presented to or spoken to the user. For another example, where the language model selects an APICALL action, the language model may also be instructed to provide text corresponding to an API call to be performed (e.g., selecting from a list of API calls or from provided descriptions of API calls) that may include information about parameters to be provided with the API calls, such as parameter names, parameter values, and/or a data type corresponding to parameter values (e.g., a string, integer, or floating point value).

In some implementations, the language model prompt may include a list of API calls. The list of API calls may be represented using any appropriate techniques. For example, the API calls may be represented as a list of function names, function argument names, and/or function argument types. In some implementations, the prompt may include an expected format for a response to the API call, such as a JSON representation of an expected response that may include one or more of keys, variable name, or data types. In the example of FIG. 4, the prompt template includes a placeholder for a list of API calls, and FIG. 5 includes a list of API calls that may be inserted into the prompt template at the position indicated by the placeholder.

Figure 6:
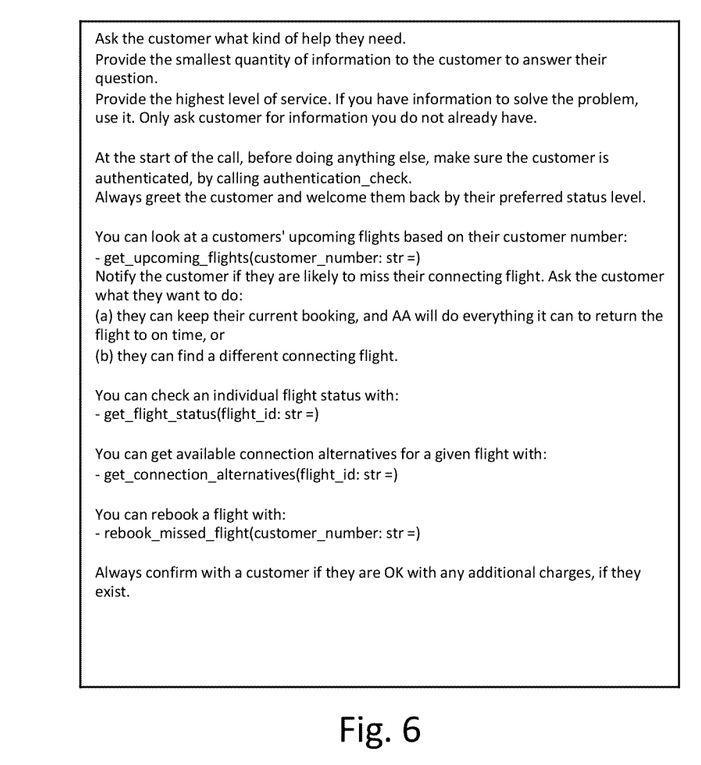
FIG. 6 are example instructions that may be used with a prompt template.

In some implementations, the language model prompt may include a description of available API calls. In the example of FIG. 4, the prompt template includes a placeholder for instructions, and FIG. 6 includes a instructions that may be inserted into the prompt template at the position indicated by the placeholder. The example instructions of FIG. 6 include example descriptions of API calls that may be selected by the language model.

In some implementations, the prompt may include a history of the communications session or session text, such as text corresponding to communications of the communications session or text representations of API calls or API call responses. The session text may include one or more of the following items: one or more communications received from the user; one or more communications transmitted to the user; one or more previous prompts submitted to the language model; one or more previous responses received from the language model; text corresponding to one or more API calls; or text corresponding to one or more API call responses.

For any of the foregoing, a representation of the session text, a representation of a portion of the session text, or a representation of one or more items may be used. For example, instead of actual communications received from the user, a representation of communications received from the user may be used, such as an automatically-generated summary of the communications (e.g., a summary computed using automated techniques, such as using the same language model used to automate the customer support process or a different mathematical model or language model). The history may be added to the prompt using any appropriate techniques, such by using a placeholder or variable in a prompt template.

In some implementations, the session text may be provided to the language model using other techniques. Each item of the communications session may be provided to the language model using any appropriate techniques. For example, where a user provides the communication "I need help", the following text may be transmitted to the language model: "User communication: I need help".

In some implementations, each item of the session text may be provided to the language model as it occurs. In some implementations, a list or sequence of strings may be provided to the language model that includes the prompt and the session text.

At step 325, the language model is queried using the prompt to obtain a language model response. In some implementations, the session text may be provided as part of the prompt or separately from the prompt. The language model may be queried using any appropriate techniques. In some implementations, an API call may be performed to submit the query. The API call may be transmitted to a third part (e.g., a provider of language model services) or may be transmitted to an internal server for providing language model services. In some implementations, the language model may be queried using a function call.

At step 330, the response from the language model is processed. The response may be processed using any appropriate techniques. In some implementations, the action selected by the language model or the type of response may be used to determine subsequent processing. In the example of FIG. 3, the language model may be instructed to select one or more of the following three actions: DONE, SPEAK, and APICALL. A selected action may be accompanied by other information, such as text to be spoken or text corresponding to an API call to be performed. Where the language model selects more than one action, the actions may be performed sequentially or in parallel.

Where the response of the language model corresponds to a DONE action, then processing may proceed to step 345 where the communications session is ended. Any other appropriate actions may be performed, such as sending a closing message to the user or updating databases relating to the operations performed during the communications session.

Where the response of the language model corresponds to a SPEAK action, then processing may proceed to step 335 where a communication is transmitted to the user. The communication may be transmitted to the user using any appropriate techniques. In some implementations, the language model may provide the text to be spoken and text-to-speech techniques may be used to present spoken audio to the user. In some implementations, the SPEAK action may instead be a TEXT action and text may be presented to the user, such as in a web interface or by sending a text or SMS message. The communication transmitted to the user may then be part of the session text.

After step 335, processing may proceed to step 315 where a communication may again be received from the user. Processing may further proceed as shown in FIG. 3 and described herein.

Returning to step 330, where the response of the language model corresponds to an APICALL action, processing may proceed to step 340 where an API call is performed. The API call may be performed using any appropriate techniques. In some implementations, the language model response may include all the information needed to perform the API, such as a URL with API parameters or a function call with argument values. In some implementations, the language model response may include information that may be used to generate the API using other information. For example, a table lookup may be performed to map the language model response to an API call to be performed.

In some implementations, other techniques may be applied to verify that the APICALL action generated by the language model is a valid API call. For example, an API call schema may be available that defines API calls and allowable parameters. The APICALL action generated by the language model may be validated against the API call schema, and where the APICALL action is not valid, other actions may be performed. For example, the language model may be instructed to correct the generated APICALL action to comply with the API call schema.

In performing the API call, an API call response may be received. The API call response may be received in any appropriate format. In some implementations, the API call response may be text representing data in the JSON (JavaScript Object Notation) format. Text corresponding to the API call and/or the API call response may then be part of the session text.

After step 340, processing may proceed to step 320 where a language model prompt may again be generated. Processing may further proceed as shown in FIG. 3 and described herein.

The processing of FIG. 3 may continue until it is determined that the communications session is complete. One or more iterations of transmitting communications to the user (e.g., as described for step 335) and performing API calls (e.g., as described for step 340) where the actions performed at each iteration may be selected by the language model.

Other variations of the techniques described herein are possible.

In some implementations, the steps of FIG. 3 may be performed in different orders. For example, a user may be able to transmit a communication at any time. Accordingly, two communications may be received from the user in a row before a communication is transmitted to the user or an API call is performed. The processing of FIG. 3 may be modified to allow a communication from the user to be processed at any time.

In some implementations, the language model may be allowed select an action to transfer (e.g., a TRANSFER action) the user from the automated support process to a human customer support agent. For example, the language model may be uncertain as to the correct next action to be performed or may be able to determine that it is not able to assist the user (e.g., the user is asking for assistance that requires an API call that is not available to the language mode).

In some implementations, the language model prompt may be generated from a prompt template, more than one prompt template may be available, and a prompt template may be dynamically selected to properly address the support request of the user. Any appropriate techniques may be used to select a prompt template. In some implementations, the session text (e.g., communications received from the user) may be processed with a classifier, such as a classifier neural network, to select a prompt template. The classifier may compute a vector where elements of the vector correspond to prompt templates and the values indicate a score (e.g., a likelihood or probability) that the prompt template is a match for the session. In some implementations, a language model (either the same language model used in FIG. 3 or a different language model) may be asked to select an appropriate prompt template given one or more items of the session text.

In some implementations, the list of available API calls that may be selected by the language model may be determined dynamically. The list of available calls may be selected in a similar manner as described above for selecting a prompt template. In some implementations, the session text (e.g., communications received from the user) may be processed with a classifier to determine a list of available API calls to be presented as options to the language model. For example, the ten API calls with the highest scores may be included in a prompt via a placeholder or via instructions included with the prompt as described herein. In some implementations, a language model (either the same language model used in FIG. 3 or a different language model) may be asked to select API calls to be used in a subsequent prompt.

The language model prompt template and/or the list of available API calls may be changed at any appropriate time. In some implementations, the language model prompt template and/or the list of available API calls may be updated at each iteration of step 320 of FIG. 3. Allowing the template and list of available API calls to change may facilitate changes in the direction of the conversation. For example, an initial support request may relate to receiving a refund on a purchase and a first prompt template and first set of available API calls may be suitable for that support request. The user may then switch to a different support request, such as changing their address. In response to the change in subject matter of the conversation, a second prompt template and a second set of available API calls may be suitable for the second support request.

In some implementations, the actions available to the language model may include changing the prompt template and/or changing the list of available API calls. For example, the prompt template of FIG. 4, may be modified to allow the language model to select those actions, such as a CHANGE_TEMPLATE action and a CHANGE_API_CALLS action. The language model may also select the new template to be used and/or a new list of available API calls to be used. At step 330 of FIG. 3, additional processing branches may be added to process those actions selected by the language model and perform the appropriate subsequent processing (e.g., obtaining a new template and/or list of available API calls).

Figure 7:
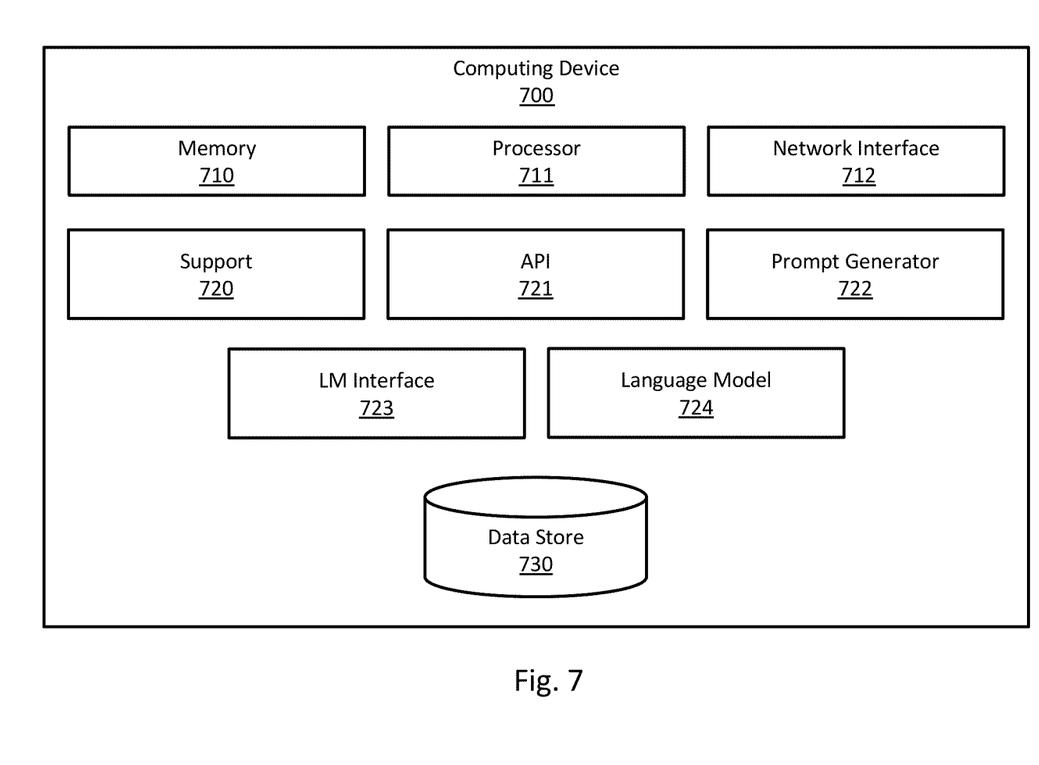
FIG. 7 illustrates components of one implementation of a computing device for automating communications using a language model.

FIG. 7 illustrates components of one implementation of a computing device 700 for implementing any of the techniques described herein. In FIG. 7, the components are shown as being on a single computing device, but the components may be distributed among multiple computing devices, such as a system of computing devices, including, for example, an end-user computing device (e.g., a smart phone or a tablet) and/or a server computer (e.g., cloud computing).

Computing device 700 may include any components typical of a computing device, such as volatile or nonvolatile memory 710, one or more processors 711, and one or more network interfaces 712. Computing device 700 may also include any input and output components, such as displays, keyboards, and touch screens. Computing device 700 may also include a variety of components or modules providing specific functionality, and these components or modules may be implemented in software, hardware, or a combination thereof. Computing device 700 may include one or more non-transitory, computer-readable media comprising computer-executable instructions that, when executed, cause a processor to perform actions corresponding to any of the techniques described herein. Below, several examples of components are described for one example implementation, and other implementations may include additional components or exclude some of the components described below.

Computing device 700 may have a support component 720 that may implement any aspects of the automated customer support techniques described herein. Computing device 700 may have an API component 721 that may perform API calls using any of the techniques described herein. Computing device 700 may have a prompt generator component 722 that may generate prompts using any of the techniques described herein. Computing device 700 may have an language model interface component 723 that may query either internal or third-party language models using any of the techniques described herein. Computing device 700 may have a language model component 724 that computes language model probabilities using any of the techniques described herein.

Computing device 700 may include or have access to various data stores. Data stores may use any known storage technology such as files, relational databases, non-relational databases, or any non-transitory computer-readable media. Computing device 700 may have data store 730 that stores any appropriate information for automating customer support, such as any of the information described herein.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in their entirety.

What is claimed is:

1. A computer-implemented method, comprising:
    starting a communications session with a user;
    obtaining session text of the communications session;
    creating a first language model prompt, wherein the first language model prompt comprises: (a) a representation of the session text, (b) a list of available API calls, and (c) instructions to select a next action from a plurality of available next actions, wherein the plurality of available next actions comprises (i) transmitting a responsive communication and (ii) performing an API call;
    submitting the first language model prompt to a language model to obtain a first language model response comprising a first next action;
    determining that the first next action corresponds to performing a first API call;
    performing the first API call to obtain a first API call response;
    creating a second language model prompt, wherein the second language model prompt comprises: (a) the representation of the session text, (b) the list of available API calls, (c) the instructions to select a next action from the plurality of available next actions, and (d) a text representation of the first API call response;
    submitting the second language model prompt to the language model to obtain a second language model response comprising a second next action;
    determining that the second next action corresponds to transmitting a first responsive communication; and
    transmitting the first responsive communication to the user.

2. The computer-implemented method of claim 1, wherein obtaining session text comprises performing automatic speech recognition of an audio communication.

3. The computer-implemented method of claim 1, wherein the second language model prompt comprises a text representation of the first API call.

4. The computer-implemented method of claim 1, comprising:
    selecting the list of available API calls using the session text.

5. The computer-implemented method of claim 4, wherein selecting the list of available API calls comprises processing at least a portion of the session text with a classifier neural network.

6. The computer-implemented method of claim 4, wherein selecting the list of available API calls comprises submitting a third language model prompt to the language model or a second language model.

7. The computer-implemented method of claim 1, wherein:
    the plurality of available next actions comprises selecting a language model prompt template;
    selecting the language model prompt template; and
    creating a third language model prompt using the language model prompt template.

8. The computer-implemented method of claim 1, wherein the second language model prompt comprises an expected format of an API call response.

9. A system, comprising at least one server computer comprising at least one processor and at least one memory, the at least one server computer configured to:
   start a communications session with a user;
   obtain session text of the communications session;
   create a first language model prompt, wherein the first language model prompt comprises: (a) a representation of the session text, (b) a list of available API calls, and (c) instructions to select a next action from a plurality of available next actions, wherein the plurality of available next actions comprises (i) transmitting a responsive communication and (ii) performing an API call;
   submit the first language model prompt to a language model to obtain a first language model response comprising a first next action;
   determine that the first next action corresponds to performing a first API call;
   perform the first API call to obtain a first API call response;
   create a second language model prompt, wherein the second language model prompt comprises: (a) the representation of the session text, (b) the list of available API calls, (c) the instructions to select a next action from the plurality of available next actions, and (d) a text representation of the first API call response;
   submit the second language model prompt to the language model to obtain a second language model response comprising a second next action;
   determine that the second next action corresponds to transmitting a first responsive communication; and
   transmit the first responsive communication to the user.

10. The system of claim 9, wherein the language model is provided by a third party and submitting the first language model prompt to the language model comprises transmitting the first language model prompt to the third party.

11. The system of claim 9, the at least one server computer is configured to:
   select a language model prompt template using the session text; and
   create the first language model prompt using the language model prompt template.

12. The system of claim 11, wherein selecting the language model prompt template comprises processing at least a portion of the session text with a classifier neural network.

13. The system of claim 11, wherein the at least one server computer is configured to select the language model prompt template by submitting a third language model prompt to the language model or a second language model.

14. The system of claim 11, wherein:
   the plurality of available next actions comprises selecting a second list of available API calls; and
   the at least one server computer is configured to:
      select the second list of available API calls, and
      create a third language model prompt using the second list of available API calls.

15. The system of claim 9, wherein the list of available API calls comprises function names and corresponding function arguments.

16. The system of claim 15, wherein the list of available API calls comprises function argument types.

17. One or more non-transitory, computer-readable media comprising computer-executable instructions that, when executed, cause at least one processor to perform actions comprising:
   starting a communications session with a user;
   obtaining session text of the communications session;
   creating a first language model prompt, wherein the first language model prompt comprises: (a) a representation of the session text, (b) a list of available API calls, and (c) instructions to select a next action from a plurality of available next actions, wherein the plurality of available next actions comprises (i) transmitting a responsive communication and (ii) performing an API call;
   submitting the first language model prompt to a language model to obtain a first language model response comprising a first next action;
   determining that the first next action corresponds to performing a first API call;
   performing the first API call to obtain a first API call response;
   creating a second language model prompt, wherein the second language model prompt comprises: (a) the representation of the session text, (b) the list of available API calls, (c) the instructions to select a next action from the plurality of available next actions, and (d) a text representation of the first API call response;
   submitting the second language model prompt to the language model to obtain a second language model response comprising a second next action;
   determining that the second next action corresponds to transmitting a first responsive communication; and
   transmitting the first responsive communication to the user.

18. The one or more non-transitory, computer-readable media of claim 17, wherein the user is obtaining customer support from a company.

19. The one or more non-transitory, computer-readable media of claim 17, wherein the first language model prompt does not include a graph corresponding to an interactive voice response system.

20. The one or more non-transitory, computer-readable media of claim 17, wherein the representation of the session text comprises an automatically-generated summary of at least a portion of the session text.

* * * * *